(12) United States Patent
Beekman et al.

(10) Patent No.: US 10,365,398 B2
(45) Date of Patent: *Jul. 30, 2019

(54) CASING INSPECTION USING PULSED NEUTRON MEASUREMENTS

(71) Applicant: Schlumberger Technology Corporation, Sugar Land, TX (US)

(72) Inventors: Sicco Beekman, Houston, TX (US); Tong Zhou, Sugar Land, TX (US); David Alan Rose, Sugar Land, TX (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 601 days.

This patent is subject to a terminal disclaimer.

(21) Appl. No.: 15/145,991

(22) Filed: May 4, 2016

(65) Prior Publication Data

US 2016/0245948 A1 Aug. 25, 2016

Related U.S. Application Data

(63) Continuation of application No. 14/325,255, filed on Jul. 7, 2014, now Pat. No. 9,335,437.

(51) Int. Cl.
| | | |
|---|---|---|
| *G01V 5/04* | (2006.01) | |
| *G01V 5/10* | (2006.01) | |
| *E21B 47/00* | (2012.01) | |
| *G01V 5/12* | (2006.01) | |
| *E21B 47/10* | (2012.01) | |

(52) U.S. Cl.
CPC .............. *G01V 5/102* (2013.01); *E21B 47/00* (2013.01); *E21B 47/1015* (2013.01); *G01V 5/045* (2013.01); *G01V 5/10* (2013.01); *G01V 5/101* (2013.01); *G01V 5/104* (2013.01); *G01V 5/125* (2013.01)

(58) Field of Classification Search
CPC ........ G01V 5/102; G01V 5/045; G01V 5/104; G01V 5/125; G01V 5/10; G01V 5/101; E21B 47/00; E21B 47/1015
See application file for complete search history.

(56) References Cited

U.S. PATENT DOCUMENTS

| | | |
|---|---|---|
| 3,889,112 A | 6/1975 | Holmes et al. |
| 4,390,783 A | 6/1983 | Grau |
| 4,446,369 A | 5/1984 | Givens et al. |

(Continued)

FOREIGN PATENT DOCUMENTS

WO 2013162505 A1 10/2013

*Primary Examiner* — Kiho Kim
(74) *Attorney, Agent, or Firm* — Michael Dae

(57) ABSTRACT

A method for evaluating wellbore conduit condition includes using measurements of at least one of (i) inelastic gamma rays made during emission a burst of neutrons into the conduit from within the conduit at at least one spaced apart location from a position of the emission and (ii) epithermal neutrons or capture gamma rays therefrom detected at at least two spaced apart locations from the position of the emission within a selected time after the emission. The at least one of the measurements of inelastic gamma rays and epithermal neutron or capture gamma ray counts are characterized to estimate an amount of loss of iron in the conduit.

18 Claims, 4 Drawing Sheets

(56) References Cited

U.S. PATENT DOCUMENTS

| | | | |
|---|---|---|---|
| 4,788,424 A * | 11/1988 | Preeg | G01V 5/101 |
| | | | 250/262 |
| 5,081,351 A | 1/1992 | Roscoe et al. | |
| 5,440,118 A | 8/1995 | Roscoe | |
| 5,699,246 A | 12/1997 | Plasek et al. | |
| 5,900,627 A | 5/1999 | Odom et al. | |
| 9,335,437 B2 | 5/2016 | Beekman et al. | |
| 2004/0256101 A1 | 12/2004 | Fox et al. | |
| 2007/0246649 A1 | 10/2007 | Jacobi et al. | |
| 2009/0248309 A1 | 10/2009 | Neville et al. | |
| 2012/0084009 A1 | 4/2012 | Peyaud et al. | |
| 2012/0091328 A1 | 4/2012 | Suparman | |
| 2014/0231640 A1 | 8/2014 | Grau et al. | |

* cited by examiner

CASING INSPECTION USING PULSED NEUTRON MEASUREMENTS

CROSS-REFERENCE TO RELATED APPLICATIONS

The current application is a continuation of, and claims the benefit of U.S. patent application Ser. No. 14/325,255, filed on Jul. 7, 2014, published on Jan. 7, 2016 as U.S. Publication No. 2016/0003025, the entire content of which is incorporate by reference into the current application.

STATEMENT REGARDING FEDERALLY SPONSORED RESEARCH OR DEVELOPMENT

Not applicable.

BACKGROUND

This disclosure is related to the field of pulsed neutron well logging apparatus and methods. More specifically, the disclosure is related to using pulsed neutron measurements to evaluate the condition of metal conduit (casing or liner) installed in wellbores drilled through subsurface formations.

Wellbores drilled through subsurface formations for the purpose of producing fluids, e.g., gas and/or oil may have a steel conduit such as a casing (a conduit that extends from the bottom of the wellbore to the surface) or a liner (a conduit that extends from the bottom of the well and is sealingly engaged with a shallower depth conduit installed in the wellbore). The casing or liner is used to protect the mechanical integrity of the wellbore and to provide hydraulic isolation of the various formations penetrated by the wellbore, among other purposes. Because casing or liner is typically made from various steel alloys, it is subject to corrosion.

It is important, for example, in older wells or in wells where corrosive fluids are being produced to determine not only the properties of the formation or the borehole fluid, but also of the casing or liner itself. Various devices are known in the art for the inspection of the thickness and surface quality (e.g. pitting, roughness or holes due to corrosion). Examples of such devices include: (i) ultrasonic logging tools (generally scan a transmitter/receiver pair and look for ultrasonic reflection); (ii) electromagnetic logging tools (measure total amount of metal present via eddy currents; (iii) multiple contact arm ("finger") caliper tools (inspect the internal surface of the casing by tracing it with a multitude of measurement fingers; and (iv) casing collar locator tools (very qualitative, but spikes in areas without casing collars can indicate casing issues).

The instruments described above may require that a wellbore tubing (a conduit having smaller diameter than the liner or casing used to increase fluid velocity from the wellbore) has to be removed from the wellbore a priori, which may be expensive and inconvenient for routine casing or liner inspection. The foregoing instruments provide no other information than that about the condition of the casing or liner (although ultrasonic inspection may provide indications of quality of the cement used to retain the casing or liner, and the caliper tool may provide indication of scale buildup inside the casing).

Unless there is a specific wellbore maintenance and monitoring plan, one usually only finds out about a problem after it occurs, because the above described casing/liner evaluation devices are typically used to characterize a problem that has already manifested itself as a problem with the wellbore (generally because of the above described inconvenience and expense of removing wellbore tubing for inspection purposes using the above described instruments).

DETAILED DESCRIPTION

Figure 1:
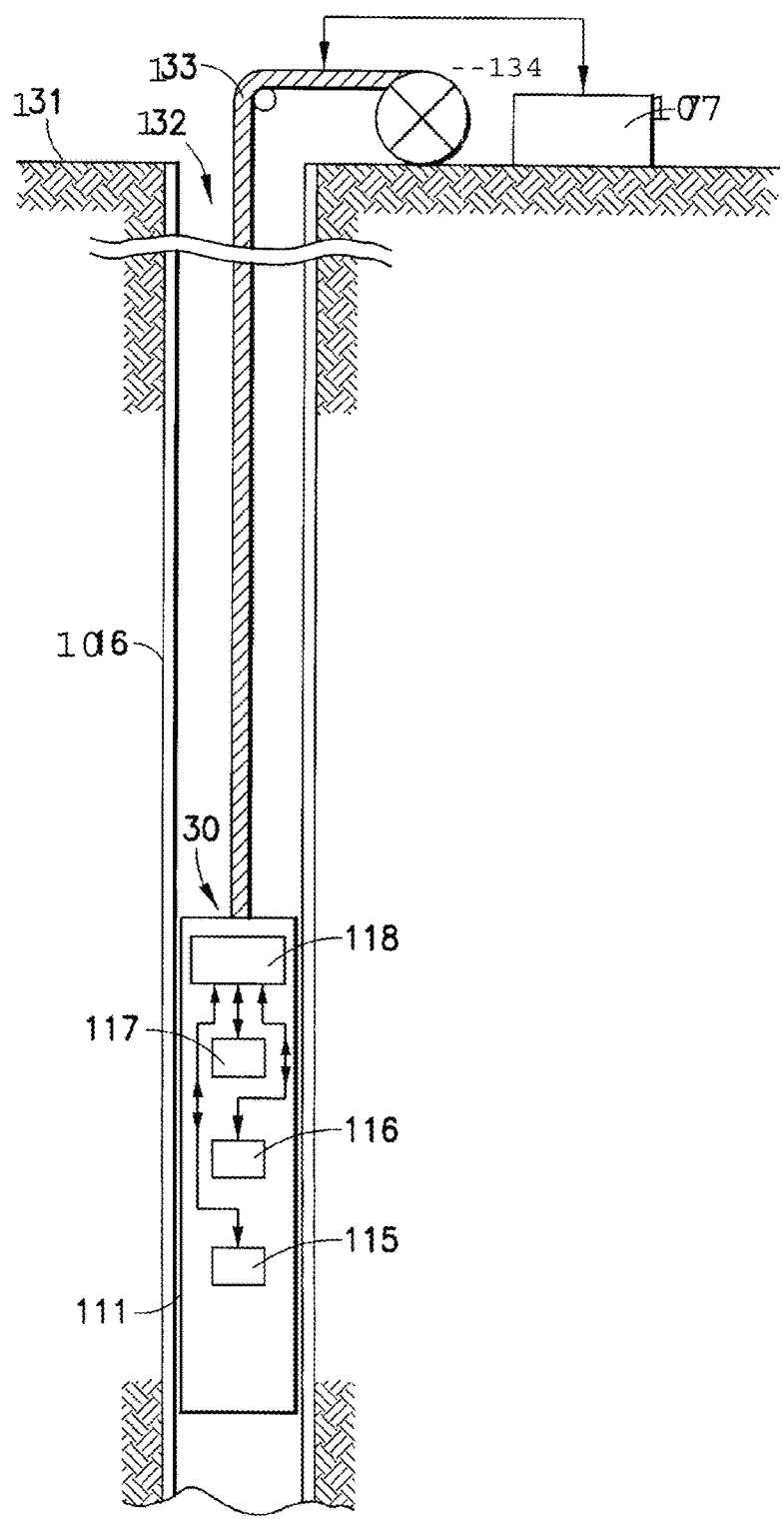
FIG. 1 shows an example wireline conveyed pulsed neutron well logging instrument.

FIG. 1 shows an example apparatus for evaluating subsurface formations 131 traversed by a wellbore 132. The present example wellbore may include a liner or casing 106 that may be evaluated using measurements made by a well logging instrument explained further below. A pulsed neutron well logging instrument 130 may be suspended in and moved along the interior of the wellbore 32 on an armored electrical cable 133, the length of which substantially determines the relative depth of the instrument 130. As is known in the art, this type of instrument can also operate in a well having tubing inserted inside the casing 106 or liner. The tubing is omitted from FIG. 1 for clarity of the illustration. The length of cable 133 may be controlled by suitable means at the surface such as a drum and winch mechanism 134. The depth of the instrument 130 within the wellbore 132 may be measured by encoders in an associated sheave wheel 133, wherein the double-headed arrow represents communication of the depth level information to the surface equipment. Surface equipment, represented at 107, may be of any type known in the art, and may include a processor subsystem and recorder (not shown separately), and communicates with the well logging instrument 130. It will be understood that certain signal processing may be performed in the well logging instrument 130 and/or at the surface, and that some of the processing may be performed at a remote location. Although the instrument 130 is shown as a single body, the instrument 130 may alternatively comprise separate components such as a cartridge, sonde or skid, and the well logging instrument 130 may be combinable with other well logging instrument. The pulsed neutron well logging instrument 130 may, in a form hereof, be of a general type described for example, in U.S. Pat. No. 5,699,246, but the foregoing example of an instrument is not a limitation on the scope of the present disclosure. The instrument 130 may include a housing 111 in the shape of a cylindrical sleeve, which is capable, for example, of running in open wellbore, cased wellbore or through a production tubing (not shown as explained above). Although not illustrated in FIG. 1, the well logging instrument 130 may also have an eccentering device, for example a bow spring, for urging the instrument 130 against the wall of the wellbore casing 106. At least one pulsed neutron generator (PNG) 115 may be mounted in the housing 111 with a near-spaced radiation detector 116 and a far-spaced radiation detector 117 mounted longitudinally above the PNG 115, each at a separate axial distance therefrom. One or more further detectors (not shown) may also be provided, it being understood that when the near and far detectors are referenced, use of further detectors can, whenever suitable, be included as well. Acquisition, control, and telemetry electronics 118 serves, among other functions, to control the timing of burst cycles of the PNG 115, the timing of detection time gates for the near 116 and far 117 radiation detectors and to telemeter count rate and other data using the cable 133 and surface telemetry circuitry, which can be part of the surface instrumentation 107. The surface processor of surface instrumentation 107 can, for example, receive detected neutron counts, detected gamma rays and/or gamma ray spectral data from near and far radiation detectors 116 and 117. The signals, whether raw detector measurements and/or processed data may be recorded as a "log" representing measured parameters with respect to depth or time on, for example, a recorder in the surface instrumentation 107. The radiation detectors may include one or more of the following types of radiation detectors, epithermal neutron detectors (e.g., $^3$He proportional counters covered by a shield to exclude thermal neutrons), and scintillation counters (which may or may not be used in connection with a spectral analyzer).

Pulsed neutron tools are commonly used for cased hole formation evaluation, because neutron radiation is one of the few means of analyzing materials behind a thick layer or iron (in this place represented by the casing).

Figure 2:
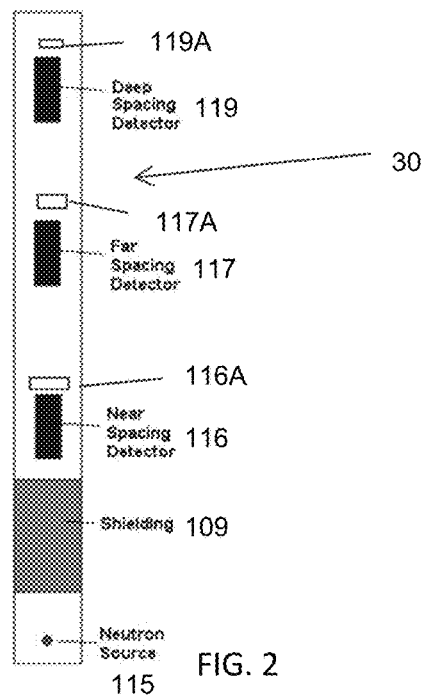
FIG. 2 shows another example pulsed neutron well logging instrument.

FIG. 2 shows another example generic multi-detector pulsed neutron logging instrument 30. Three scintillation type gamma ray detectors, 116, 117, 119 are shown in the present example but for some applications a single detector may suffice. The detectors 116, 117, 119 may be disposed at successively longer axial spacings from a neutron source 115. Shielding 109 may be disposed between the neutron source 115 and the nearest of the detectors 116 to reduce effects of neutrons being detected directly from the source 115. The telemetry electronics (118 in FIG. 1) or other electronics in the instrument 30 may include a multi-channel pulse height analyzer for each gamma ray detector. Such analyzers may characterize the energy level of each gamma ray detected by each of the detectors 116, 117, 119 to enable certain types of analysis to be further explained below.

The neutron source 115 in the present example instrument may be a pulsed neutron generator, as explained with reference to FIG. 1. The neutron generator 115 can be based on either the deuterium-tritium reaction (with source energy of 14.1 MeV) or the deuterium-deuterium reaction (with the source energy of 2.45 MeV). Other suitable reactions could also be used for a pulsed neutron source. In some examples, the gamma ray detectors 116, 117, 119 each may be supplemented by an epithermal neutron detector 116A, 117A, 119A. The epithermal neutron detectors may be $^3$He proportional counters enclosed by a thermal neutron shielding material, such as a layer of cadmium metal, such that thermal neutrons are substantially excluded from the $^3$He proportional counters. Thus the $^3$He proportional counters may detect substantially only epithermal neutrons.

The general concept of a pulsed neutron measurement is that the neutron generator 115 is turned on for a preselected time interval (e.g. for 20 microseconds) and then is turned off for a selected period before a successive "on" period as above. The "off" period may have a wide range of time durations, for example, from 30 microseconds to 20 milliseconds or more. The specific sequence of "on" and "off" times for the neutron generator is called the "burst pattern."

The burst pattern may be optimized for different measurement types. Measurements of the returning gamma rays by the gamma ray detectors 116, 117, 119 during the generator "on" time (during the "burst") and after the burst (during the "off time") may be used to determine certain properties of the media surrounding the instrument 30.

Examples of the types of measurements that may be made using pulsed neutron well logging instruments may be broadly be classified as follows:

Detector ratios (gamma ray or neutron); Ratios of count rates between different detectors during any time of the burst pattern.

Detector count rates (gamma ray or neutron); Number of gamma rays or neutrons detected by each of the detectors in a given time period during any time of the burst pattern and normalized by a neutron monitor (i.e., a neutron detector placed proximate to the source to correct for output variations).

Decay times (gamma ray or thermal/epithermal neutrons); Decay of the number of gamma rays or neutrons detected by the detectors in a given time period during any time of the burst pattern.

Energy window count rates; Number of gamma rays detected by the detectors in a given energy range during any time of the burst pattern. These rates can be potentially normalized by the total count rate in a spectrum or by the neutron monitor or another gamma ray detector.

Energy spectrum relative yields; A fraction or percentage of the gamma rays in the thermal neutron capture detection time interval (during a burst-off period) or inelastic gamma rays emitted during a burst-on period may be spectrally analyzed with respect to energy level to determine amounts or fractional quantities of certain chemical elements in the surrounding media by decomposing the measured gamma ray spectrum into components that are known to be characteristic of those elements (those components are referred to as standard spectra).

Herein are proposed several methods for determining the amount of casing (or liner) iron that is present in a wellbore having a casing or liner disposed therein. Depending on methods of normalization, these methods can be used quantitatively or qualitatively. The described methods can be used individually or in combination.

A. Inelastic Iron Yields From Gamma Ray Spectral Analysis (Inelastic Yields May Be Particularly Useful in Wells Having a Large Amount of Thermal Neutron Absorbers)

Figure 3:
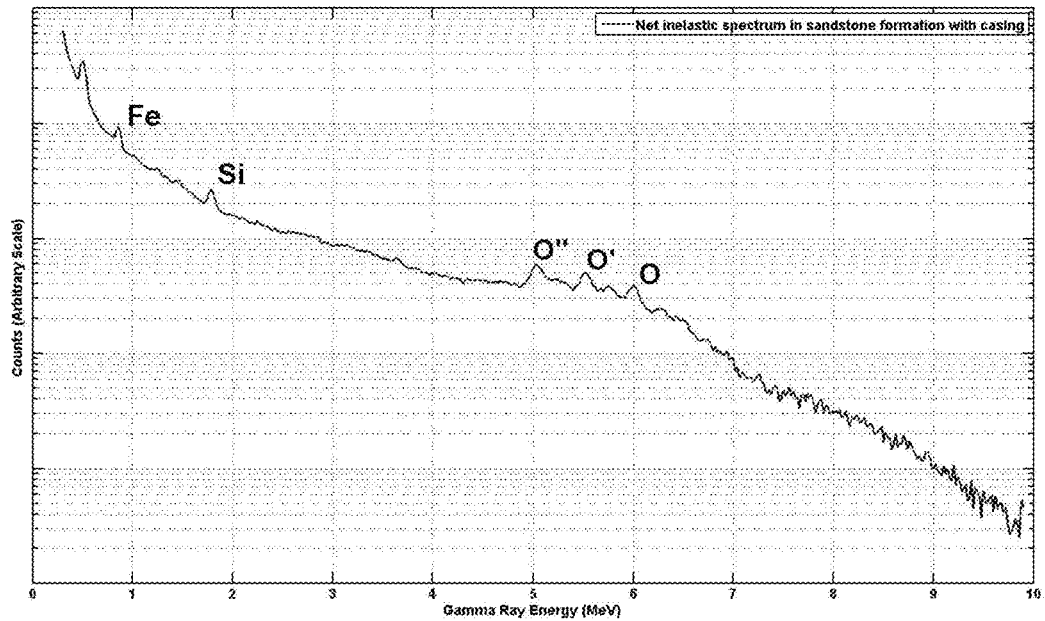
FIG. 3 shows an example of a net inelastic GR spectrum from a laboratory sandstone formation with casing showing energy peaks of different characteristic elements including Fe from steel casing.

FIG. 3 shows an example cased wellbore gamma ray energy spectrum recorded by a gamma ray detector during a period when the neutron generator is on. The spectrum has been corrected for alteration caused by thermal neutron capture counts that also occur during the burst. The example spectrum clearly shows the features from the iron component Fe (i.e., the peak around 0.85 MeV), the oxygen component O, O', O" (i.e., the peaks around 5-6 MeV) and the silicon component Si (i.e., the peak around 1.8 MeV). A decomposition of the spectrum, using a technique known in the art using so-called "standard spectra" for each element, can generate "yields" which give an indication of the relative amount of an element that is present in the media surrounding the well logging instrument. The example spectrum shown in FIG. 3 may be made using the gamma rays detected by only one of the detectors in the example instrument shown in FIG. 2.

It is proposed to use the inelastic iron yield as an indicator of the presence or absence of casing and/or tubing iron. Small corrections for formation iron may be needed in some cases, but the iron yield signal from the casing (or liner) generally dominates the inelastic yield spectrum. A possible benefit of using inelastic gamma ray spectroscopy is that it is generally a more shallow (i.e., shorter lateral distance from the instrument) measurement, making it more sensitive to the media near the tool. An example of the aforementioned technique can be to compare the amount of iron which determined to be present from the spectral analysis to the amount of iron that is expected to be present in undamaged casing based on the known casing thickness (generally expressed in terms of casing outer diameter and weight per unit length) and determining iron loss due to corrosion. The undamaged casing response may be calculated or may be measured using an actual well logging instrument moved through a known undamaged segment of such casing (or liner).

B. Capture Iron Yields

A method similar to the decomposition of the inelastic spectrum can also be used for the capture gamma ray spectrum. Iron content determined from the capture gamma ray spectrum can also be used for determination of the amount of iron in the casing/liner in a wellbore.

C. Inelastic Count Rate or Count Rate Ratio (IRAT)

Figure 4:
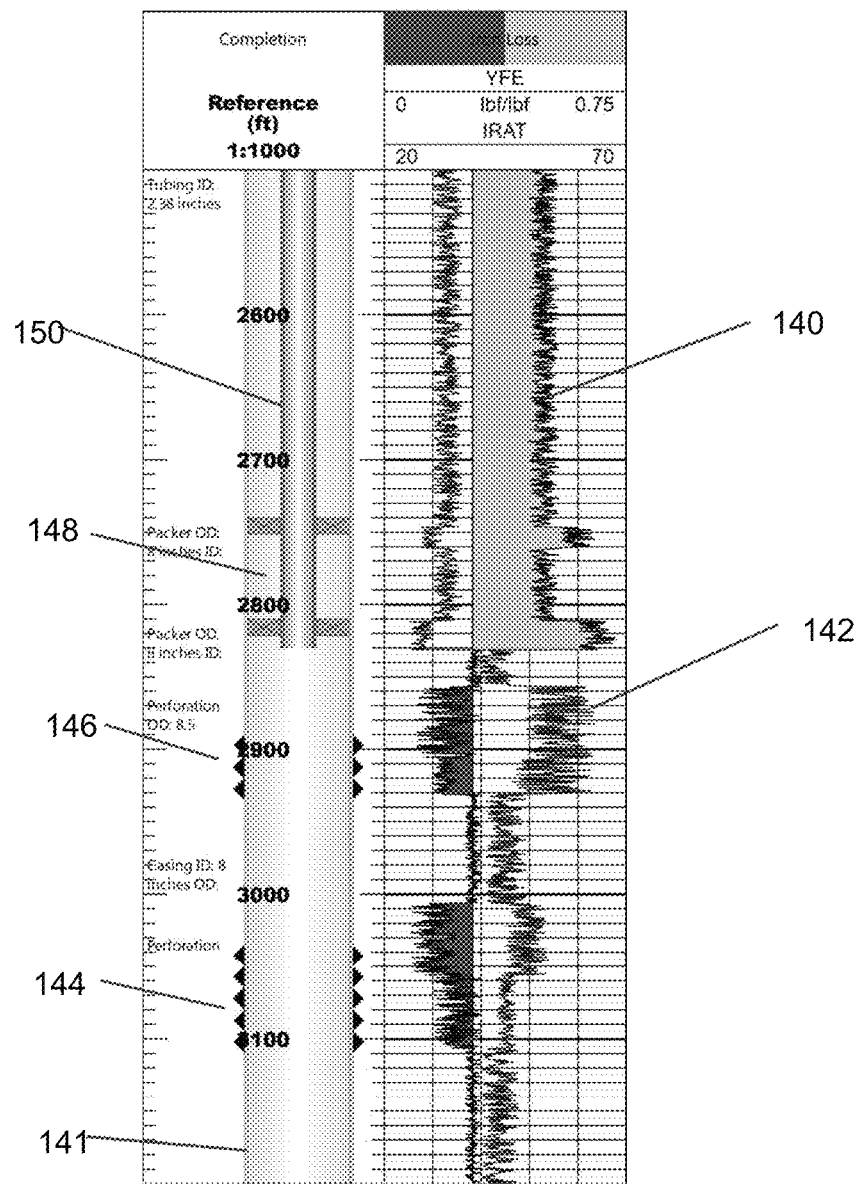
FIG. 4 shows an example well log placed next to a schematic drawing of a cased wellbore having a tubing and packer. The log example is of IRAT (Inelastic ratio) and YFE (Inelastic Iron yield from spectroscopy) as indicators of casing condition.

The count rate of the individual gamma ray detectors during the neutron burst is very sensitive to the conditions in the wellbore due to limited depth of investigation. Comparison of inelastic (also referred to as burst) count rates in the different gamma ray detectors (e.g., as shown in FIG. 4) may also be used to indicate the presence or absence of casing when the wellbore fluid and surrounding formation properties are known and/or are constant. Comparison of the burst inelastic count rates in two or more different detectors may be performed directly in a cross-plot or indirectly by taking a ratio of count rates. One may define IRAT in this example and a total gamma ray count rate during the neutron burst made by a farther spaced detector with respect to a nearer spaced detector. Other embodiments may use energy discrimination for purposes of which gamma rays to detect. FIG. 4 shows a cross-sectional diagram of a wellbore having a casing 141 therein. The casing 141 has two perforated intervals, shown at 144 and 146. A packer 148 is affixed to the interior of the casing 141 and seals an annular space between the casing 141 and a production tubing 150 (referred to in some cases as a "velocity string"). The right hand side of FIG. 4 shows graphs with respect to depth of inelastic spectral iron yield 140 and inelastic gamma ray detection ratio between two detectors at 142. The graphs 140, 142 indicate severe corrosion from 3100 feet to 3000 feet and from 2860 feet to 2930 feet depth. The corrosion indication coincides with zones where the well is perforated, suggesting that corrosive produced fluid may have caused the corrosion. Above 2830 feet depth, the presence of the packer 148 and a tubing 150 can clearly be observed due to the increased values of the iron spectral yield curve 140 and reduced IRAT curve 142.

D. Decay Time

The decay time for gamma ray or neutron counts may be used in a variety of ways to qualitatively or quantitatively detect the presence or absence of iron in a particular wellbore.

(i) Borehole capture cross section (using gamma ray or neutron detectors): Pulsed neutron tools have been used to determine a borehole capture cross section to correct the formation cross section. The borehole capture cross section may also be used to determine an amount of iron that is present, due to the fact that iron is a good neutron absorber. Corrections may have to be made for the presence of fluids (e.g., chlorine based brine) and other materials in the interior of the casing.

(ii) Slowing down time (using gamma ray or epithermal neutron detectors): The decay of a gamma ray count rate or an epithermal neutron count rate within less than 10 microseconds after the end of the neutron burst is an indication of the decay of the epithermal neutron population near the well logging instrument. A measurement of this decay time is thus very shallow laterally and may be very sensitive to the presence of standoff or formation porosity. The shallowness and sensitivity of this measurement to standoff and porosity can be used to indicate and quantify corroded casing.

E. Tool Positioning While Running the Log

Depending on the casing diameter, many pulsed neutron tools take up only a small part of the cross sectional area of the casing. Generally, the tools are run eccentered (by means of a bowspring, gravity or other positioning method) to make the measurements more sensitive to the formation. In order to increase the sensitivity of the tool to the borehole or in order to make comparisons of formation effects to borehole effects, the well logging instrument can be run centered, or both centered and eccentered in subsequent runs.

Figure 5:
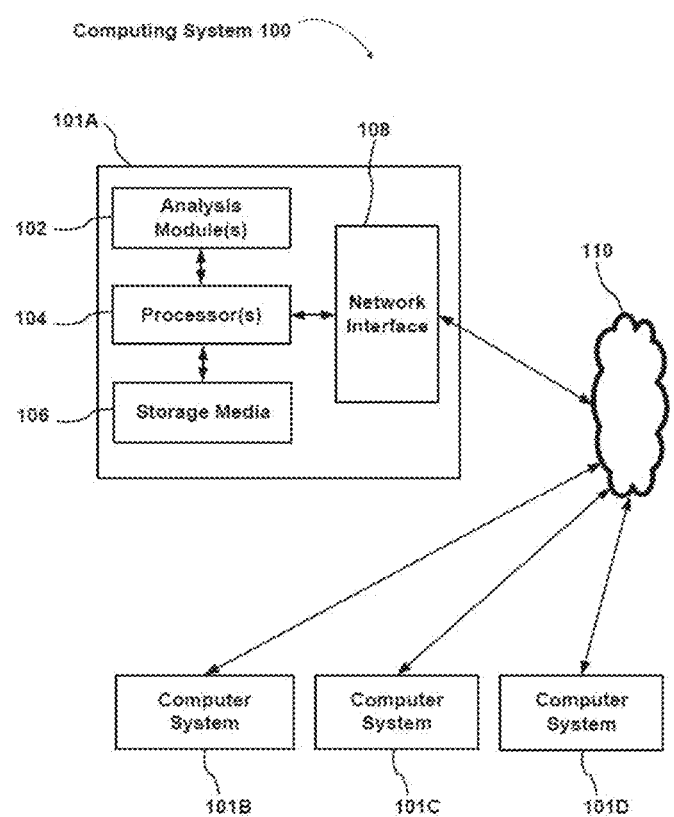
FIG. 5 shows an example computer system that may be used in some embodiments.

FIG. 5 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks described above with reference to FIGS. 3 and 4. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well location, e.g., in the surface recording unit 107 in FIG. 1, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 5 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 5, and/or computing system 100 may have a different configuration or arrangement of the components depicted in FIG. 5. The various components shown in FIG. may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating wellbore conduit condition, comprising:
   accepting as input to a computer measurements of at least one of (i) inelastic gamma rays made during emission a burst of neutrons into the conduit from within the conduit at at least one spaced apart location from a position of the emission and (ii) epithermal neutrons or capture gamma rays therefrom detected at at least two spaced apart locations from the position of the emission within a selected time after the emission;
   in a computer, characterizing the at least one of the measurements of inelastic gamma rays and epithermal neutron or capture gamma ray counts to estimate an amount of loss of iron in the conduit; and
   displaying a parameter related to the amount of iron loss.

2. The method of claim 1 further comprising repeating the using measurements made at different positions along an interior of the conduit.

3. The method of claim 1 wherein the characterizing comprises comparing characterized measurements made in a known undamaged section of conduit to the measurements made within the conduit.

4. The method of claim 1 wherein the characterizing the measurements of inelastic gamma rays comprises determining in the computer an iron yield from a spectral analysis of the inelastic gamma rays.

5. The method of claim 1 further comprising using measurements of inelastic gamma rays detected during the emission at at least a second location spaced apart from the at least one location and in the computer determining a ratio of inelastic gamma rays detected at the at least one location and the at least one additional location and using the ratio to estimate a condition of the conduit.

6. The method of claim 5 wherein the estimating the condition from the ratio comprises measuring the ratio in a known undamaged section of the conduit and comparing to the ratio determined in the wellbore conduit.

7. The method of claim 6 further comprising using a ratio determined from measurements of inelastic gamma rays made proximate a wall of the conduit and a ratio determined from measurements of inelastic gamma rays made proximate a center of the conduit, and in the computer comparing the ratio from proximate the wall to the ratio proximate the center to identify portions of the conduit having iron loss.

8. The method of claim 1 wherein the characterizing the measurements of epithermal neutrons of capture gamma rays therefrom comprises in the computer estimating a neutron capture cross-section in the conduit, and estimating an iron content of the conduit from the neutron capture cross-section.

9. The method of claim 1 further comprising using measurements of inelastic gamma rays and epithermal neutron or capture gamma ray counts made proximate a wall of the conduit and made proximate a center of the conduit, and in the computer comparing the measurements made proximate the wall of the conduit to the measurements made in the center of the conduit to identify areas of the conduit subject to iron loss.

10. A method for evaluating wellbore conduit condition, comprising:
    (a) moving a pulsed neutron well logging instrument along an interior of a wellbore having at conduit therein;
    (b) emitting at least one burst of neutrons into the conduit;
    (c) measuring at least one of (i) inelastic gamma rays made during the burst of neutrons into the conduit from within the conduit at at least one spaced apart location from a position of the emission and (ii) epithermal neutrons or capture gamma rays therefrom detected at at least two spaced apart locations from the position of the emission within a selected time after the emission;
    (d) characterizing the at least one of the measurements of inelastic gamma rays and epithermal neutron or capture gamma ray counts to estimate an amount of loss of iron in the conduit; and
    (e) displaying a parameter related to the amount of iron loss.

11. The method of claim 10 further comprising repeating (b) through (e) using measurements made at different positions along an interior of the conduit.

12. The method of claim 10 wherein the characterizing comprises comparing characterized measurements made in a known undamaged section of conduit to the measurements made within the conduit.

13. The method of claim 10 wherein the characterizing the measurements of inelastic gamma rays comprises determining an iron yield from a spectral analysis of the inelastic gamma rays.

14. The method of claim 10 further comprising using measurements of inelastic gamma rays detected during the burst at at least a second location spaced apart from the at least one location and in the computer determining a ratio of inelastic gamma rays detected at the at least one location and the at least one additional location and using the ratio to estimate a condition of the conduit.

15. The method of claim 14 wherein the estimating the condition from the ratio comprises measuring the ratio in a known undamaged section of the conduit and comparing to the ratio determined in the wellbore conduit.

16. The method of claim 15 further comprising using a ratio determined from measurements of inelastic gamma rays made proximate a wall of the conduit and a ratio determined from measurements of inelastic gamma rays made proximate a center of the conduit, and in the computer comparing the ratio from proximate the wall to the ratio proximate the center to identify portions of the conduit having iron loss.

17. The method of claim 10 wherein the characterizing the measurements of epithermal neutrons of capture gamma rays therefrom comprises estimating a neutron capture cross-section in the conduit, and estimating an iron content of the conduit from the neutron capture cross-section.

18. The method of claim 10 further comprising using measurements of inelastic gamma rays and epithermal neutron or capture gamma ray counts made proximate a wall of the conduit and made proximate a center of the conduit, and comparing the measurements made proximate the wall of the conduit to the measurements made in the center of the conduit to identify areas of the conduit subject to iron loss.

* * * * *